United States Patent
Cho et al.

(10) Patent No.: US 11,853,336 B2
(45) Date of Patent: *Dec. 26, 2023

(54) METHOD AND APPARATUS FOR PROVIDING RELATION NOTE USING CORRELATION

(71) Applicant: FASOO, Seoul (KR)

(72) Inventors: Kyu Gon Cho, Goyang-si (KR); Jong Sin Choi, Seoul (KR); Kyoung Ho Jeon, Seoul (KR); Jin Sang Park, Seoul (KR); Sung Ho Song, Gyeonggi-do (KR)

(73) Assignee: Fasoo Co. Ltd., Seoul (KR)

( * ) Notice: Subject to any disclaimer, the term of this patent is extended or adjusted under 35 U.S.C. 154(b) by 16 days.

This patent is subject to a terminal disclaimer.

(21) Appl. No.: 17/349,964

(22) Filed: Jun. 17, 2021

(65) Prior Publication Data

US 2021/0311976 A1   Oct. 7, 2021

Related U.S. Application Data

(63) Continuation of application No. 15/739,285, filed as application No. PCT/KR2016/006770 on Jun. 24, 2016, now Pat. No. 11,068,521.

(30) Foreign Application Priority Data

Jun. 26, 2015  (KR) .......................... 10-2015-0091529

(51) Int. Cl.
  G06F 16/00       (2019.01)
  G06F 16/33       (2019.01)
  (Continued)

(52) U.S. Cl.
  CPC .......... G06F 16/334 (2019.01); G06F 16/176 (2019.01); G06F 16/338 (2019.01);
  (Continued)

(58) Field of Classification Search
  None
  See application file for complete search history.

(56) References Cited

U.S. PATENT DOCUMENTS

| | | | |
|---|---|---|---|
| 6,645,075 B1 | 11/2003 | Gatto | |
| 8,056,122 B2 * | 11/2011 | Cho | G06F 21/35 |
| | | | 380/59 |

(Continued)

FOREIGN PATENT DOCUMENTS

| | | |
|---|---|---|
| CN | 103765787 | 4/2014 |
| JP | 2011-128833 A | 6/2011 |

(Continued)

OTHER PUBLICATIONS

International Search Report for PCT/KR2016/006770 from the Korean Intellectual Property Office, 11 pages.

(Continued)

*Primary Examiner* — Hasanul Mobin
(74) *Attorney, Agent, or Firm* — AJU Kim Chang Lee

(57) ABSTRACT

A technology related to a method and apparatus for providing a relation note using correlation is disclosed. The method for providing the relation note, which is performed by a relation note providing server interworking with a user terminal, comprises the steps of: receiving one or more generated notes from the user terminal; updating, according to a configurable reference, correlation between notes indicating a relation between the one or more notes; and providing the one or more notes to the user terminal on the basis of the correlation between the notes. Therefore, the method may provide a user interface which is intelligent and smart to enable a plurality of notes to be more effectively identified and managed on the basis of the correlation.

20 Claims, 7 Drawing Sheets

(51) Int. Cl.
  *G06F 16/176* (2019.01)
  *G06F 16/338* (2019.01)
  *G06Q 10/06* (2023.01)
  *H04W 4/00* (2018.01)
  *G06Q 10/10* (2023.01)

(52) U.S. Cl.
  CPC ............ *G06Q 10/06* (2013.01); *G06Q 10/10* (2013.01); *H04W 4/00* (2013.01)

(56) References Cited

U.S. PATENT DOCUMENTS

| | | | |
|---|---|---|---|
| 8,296,363 B2* | 10/2012 | Yamazoe | G06Q 10/00 709/204 |
| 9,495,416 B2 | 11/2016 | Kaist | |
| 9,652,617 B1* | 5/2017 | Evans | G06F 21/57 |
| 9,697,258 B2* | 7/2017 | Barton | G06F 16/9535 |
| 10,171,398 B2 | 1/2019 | Lee et al. | |
| 2008/0281915 A1* | 11/2008 | Elad | G06Q 30/02 709/204 |
| 2010/0235764 A1 | 9/2010 | Yamazoe | |
| 2013/0018838 A1 | 1/2013 | Parnaby | |
| 2013/0050022 A1 | 2/2013 | Feger et al. | |
| 2013/0050220 A1 | 2/2013 | Kim et al. | |
| 2013/0117285 A1 | 5/2013 | Ishij | |
| 2013/0218829 A1* | 8/2013 | Martinez | G06Q 10/10 707/608 |
| 2013/0275432 A1* | 10/2013 | Bandara | G06F 16/35 707/739 |
| 2014/0052712 A1* | 2/2014 | Savage | G06F 3/0484 707/738 |
| 2014/0067702 A1* | 3/2014 | Rathod | G06Q 50/01 705/319 |
| 2014/0074879 A1 | 3/2014 | Kwon et al. | |
| 2014/0129331 A1* | 5/2014 | Spivack | G06Q 30/0255 705/14.53 |
| 2014/0157148 A1 | 6/2014 | Joo et al. | |
| 2014/0286581 A1 | 9/2014 | Horiuchi | |
| 2014/0351350 A1* | 11/2014 | Lee | G06F 40/30 709/206 |
| 2015/0134439 A1 | 5/2015 | Maxwell | |
| 2016/0179838 A1* | 6/2016 | Mavinakuli | G06F 16/176 707/618 |
| 2018/0307381 A1* | 10/2018 | Bashir | G06F 3/0481 |

FOREIGN PATENT DOCUMENTS

| | | |
|---|---|---|
| KR | 1020140038577 A | 3/2014 |
| KR | 1020140047308 A | 4/2014 |
| KR | 1020140070937 A | 6/2014 |
| KR | 2014-0137030 A | 12/2014 |
| KR | 1020150045236 A | 4/2015 |
| WO | 2012-131430 A1 | 10/2012 |
| WO | WO 2012/131430 | 10/2012 |
| WO | 2016/209026 A1 | 12/2016 |

OTHER PUBLICATIONS

Takahasi et al. NeighborNote Application with a notebook associative function based on the user's operation history, Evernote 2014 Collection of paper, Japan, General Incorporation Information Processing Society, Mar. 1, 2014, pp. 694 to 698.

Simple memorandum applications, Mac, IOs users, very convenience memo, Cloud Service Business, Japan, Ei Publishing Co., Ltd., Apr. 10, 2014, pp. 56.

* cited by examiner

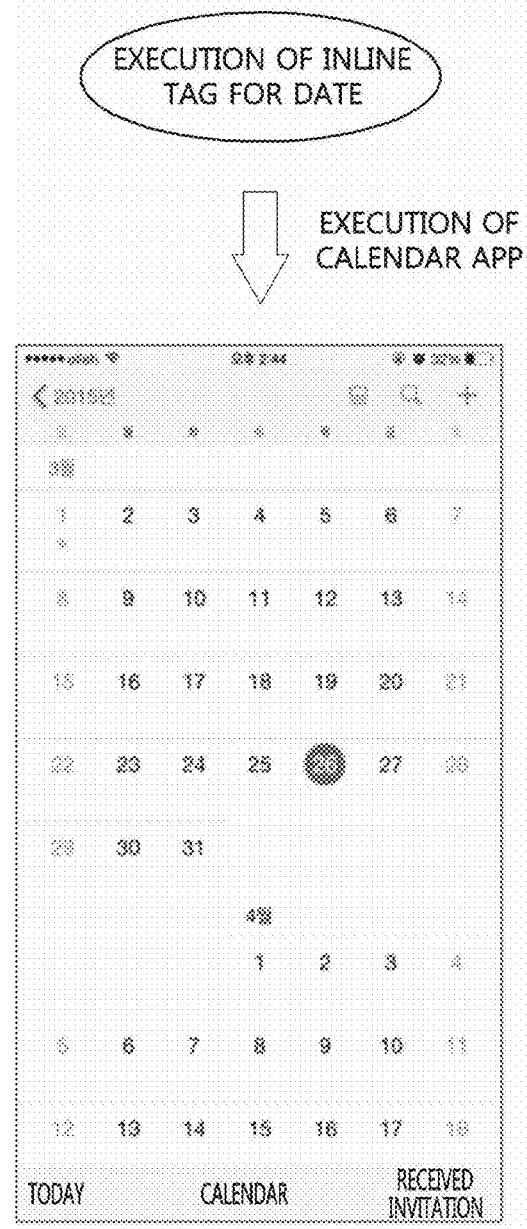

METHOD AND APPARATUS FOR PROVIDING RELATION NOTE USING CORRELATION

CLAIM FOR PRIORITY

This application claims priority to Korean Patent Application No. 10-2015-0091529 (filed Jun. 26, 2015) and PCT Patent Application No. PCT/KR2016/006770 (filed Jun. 24, 2016) in the Korean Intellectual Property Office (KIPO), the entire contents of which are hereby incorporated by reference in their entireties. This patent application is a continuation application of and claims priority to U.S. patent application Ser. No. 15/739,285 (filed Jan. 24, 2018), which is hereby incorporated by reference in its entirety.

BACKGROUND

1. Technical Field

Example embodiments of the present invention relate to provision of an associated note, and more particularly to a method and apparatus for providing an associated note using degrees of association

2. Related Art

A smart phone or a like personal portable terminal provides various functions such as memo, note, diary, dictionary, digital camera, and web browsing functions, etc., beyond a simple phone call function.

As the most common function among them, a memo or note function provides a function of storing, without paper or pen, something necessary to remember in a portable terminal. That is, a user organizes and saves information collected from various situations in each individual note.

Since current memo or note functions place emphasis on simply listing and storing only text information, there is a shortage of provision of a user interface through which a user can effectively manage a plurality of memos or notes.

For example, a user fragments relatively simple information such as schedule, places, things to do, etc. and easily saves them in a plurality of memos or notes. Further, there frequently occur situations in which such a plurality of fragmented memos or notes have to be checked simultaneously or together. That is, information which a user needs is between pieces of information associated with each other and organized in different notes.

However, current memo or note functions lack a user interface for checking and managing such a plurality of fragmented memos or notes in accordance with user convenience.

SUMMARY

Accordingly, example embodiments of the present invention are provided to substantially obviate one or more problems due to limitations and disadvantages of the related art.

Example embodiments of the present invention provide a method of providing an associated note, in which a user interface for more effectively checking and managing a plurality of notes based on degrees of association is provided.

Example embodiments of the present invention also provide an apparatus for providing an associated note, in which a user interface for more effectively checking and managing a plurality of notes based on degrees of association is provided.

Example embodiments of the present invention also provide a method and apparatus for providing an associated note, in which an inline tag is used to interwork with other applications, the web, or the like.

In some example embodiments, a method of providing an associated note, which is performed in an associated-note providing server interworking with a user terminal, includes receiving at least one note generated from the user terminal; updating degrees of association between notes, which indicate association with the at least one note, with respect to a settable reference; and providing the at least one note to the user terminal on the basis of the degrees of association between the notes.

Herein, the updating of the degrees of association between the notes with the settable reference may be performed by learning based on at least one among an elapsed time, the number of association inquiries, an inquiry time, an association degree score assigned by a user, the order in which a user clicks the associated notes, and similarity between pieces of information included in the at least one note.

Herein, the providing of the at least one note may include displaying the at least one note on the user terminal in descending order of degrees of association between notes with respect to a selected note of the at least one note.

Herein, the method further include sharing the at least one note with a user group with which a note is allowed to be shared.

Herein, the user group with which the note is allowed to be shared may be set or synchronized by the user terminal.

Herein, the at least one note may include an inline tag and interwork with a view function corresponding to the inline tag.

In other example embodiments, a method of providing an associated note, which is performed in a user terminal interworking with an associated-note providing server, includes: generating at least one note in response to an input of information; and displaying the at least one note based on degrees of association between notes, which show an association among the at least one note, wherein the degrees of association between notes is updated with respect to a reference settable in the associated-note providing server.

In still other example embodiments, a method of providing an associated note, which is performed in a user terminal interworking with an associated-note providing server, includes: generating a note including an inline tag in response to an input of information; extracting a view function corresponding to the inline tag; and interworking the extracted view function with the generated note.

Herein, the inline tag may be related to at least one of a name, a phone number, an e-mail address, a date, a place, and a time.

Herein, the extracted view function may include an additional function of the generated note.

Herein, the extracted view function may be supported by an application or the web which performs at least one function among contact management, e-mail transmission, calendar display, map display, things to do, schedule management, and alarm functions.

Herein, information tagged with the inline tag may be synchronized by an application or the web.

Herein, the generated note may have degrees of association between notes, which shows an association with another note, and the degrees of association between notes may be updated with respect to a reference settable in the associated-note providing server.

Herein, the degrees of association between notes may be updated by learning based on at least one among elapsed time, the number of association inquiries, an inquiry time, an association degree score assigned by a user, the order in which a user clicks associated notes, and similarity between pieces of information included in at least one note.

In yet other example embodiments, a method of providing an associated note, which is performed in an associated-note providing server interworking with a user terminal, includes: receiving at least one note generated from the user terminal; analyzing information related to the at least one note; and providing a service, which is specialized and customized for a user, to the user terminal on the basis of results of the analysis.

Herein, the information related to the note may include at least one of note content, an association between notes, and a usage history, and the customized service may be provided including information about selection and arrangement of notes, or about associated applications.

BRIEF DESCRIPTION OF DRAWINGS

Example embodiments of the present invention will become more apparent by describing in detail example embodiments of the present invention with reference to the accompanying drawings, in which:

FIG. 9 is a second example view for describing interworking between an application and a note generated according to an example embodiment.

DESCRIPTION OF EXAMPLE EMBODIMENTS

Figure 1:
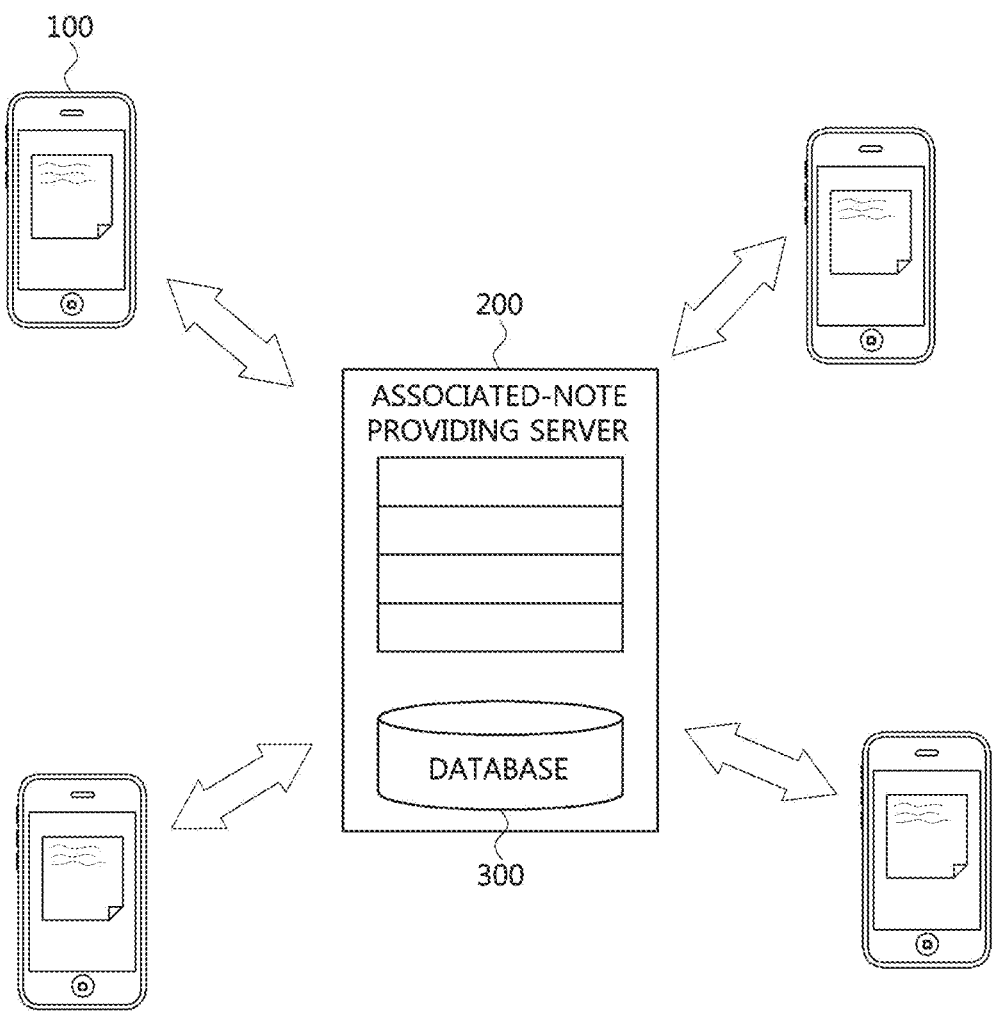
FIG. 1 is a conceptual view for describing an environment for providing a method of providing an associated note according to an example embodiment.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Below, example embodiments will be described in detail with reference to the accompanying drawings.

FIG. 1 is a conceptual view for describing an environment for providing a method of providing an associated note according to an example embodiment.

Referring to FIG. 1, the method of providing the associated note according to an example embodiment may be implemented by interworking between a plurality of user terminals 10 and an associated-note providing server 200.

Specifically, a user may use the user terminal 100 to make or generate a note, and the note made or generated by the user terminal 100 is transmitted to the associated-note providing server 200. Here, the user terminal 100 may refer to a mobile phone, a smart phone, a notebook computer, a tablet personal computer (PC), etc. without specific limitations.

Further, according to this example embodiment, the note refers to relatively simple information stored in a digital form, and may be used as a concept equivalent to a digital note, a memo, a digital memo, a page, a digital page, etc.

The associated-note providing server 200 may receive a plurality of made or generated notes from the user terminal 100, and store it in the database 300. Further, the associated-note providing server 200 may analyze content of each individual note, an association between the notes, a user's note usage history, etc.

The user terminal 100 may download and install an application from an app store or the associated-note providing server 200 to check and receive a plurality of notes through the associated-note providing server 200, and the installed application may offer an associated-note providing service by interworking with the associated-note providing server 200.

A user may make or generate a plurality of notes by inputting information through the user terminal 100, and an association between the plurality of generated notes may be set as degrees of association between notes. Here, the degrees of association between notes may be learned and updated in accordance with information included in the notes, a usage pattern of a user, etc.

Therefore, a user can, based on the degrees of association between notes, easily check and manage the plurality of notes in which fragmented pieces of information such as schedules, places, things to do, etc. are stored.

Furthermore, as an additional function, the associated-note providing server 200 may be built or managed by a certain enterprise so that employees of the enterprise can share a note with one another, but not limited thereto.

Further, the associated-note providing server 200 may support a service in which a phone number, e-mail address information, and the like stored in the plurality of user terminals 100 are synchronized with each other.

A user may set degrees of association between the note generated by the user terminal 100 and a note generated by another user terminal 100.

Further, the user terminal 100 may search in the associated-note providing server 200 for a note whose association has been set, and a search range may be limited to a note allowed to be shared. That is, a user may also set whether to share a note generated through the user terminal 100.

Figure 2:
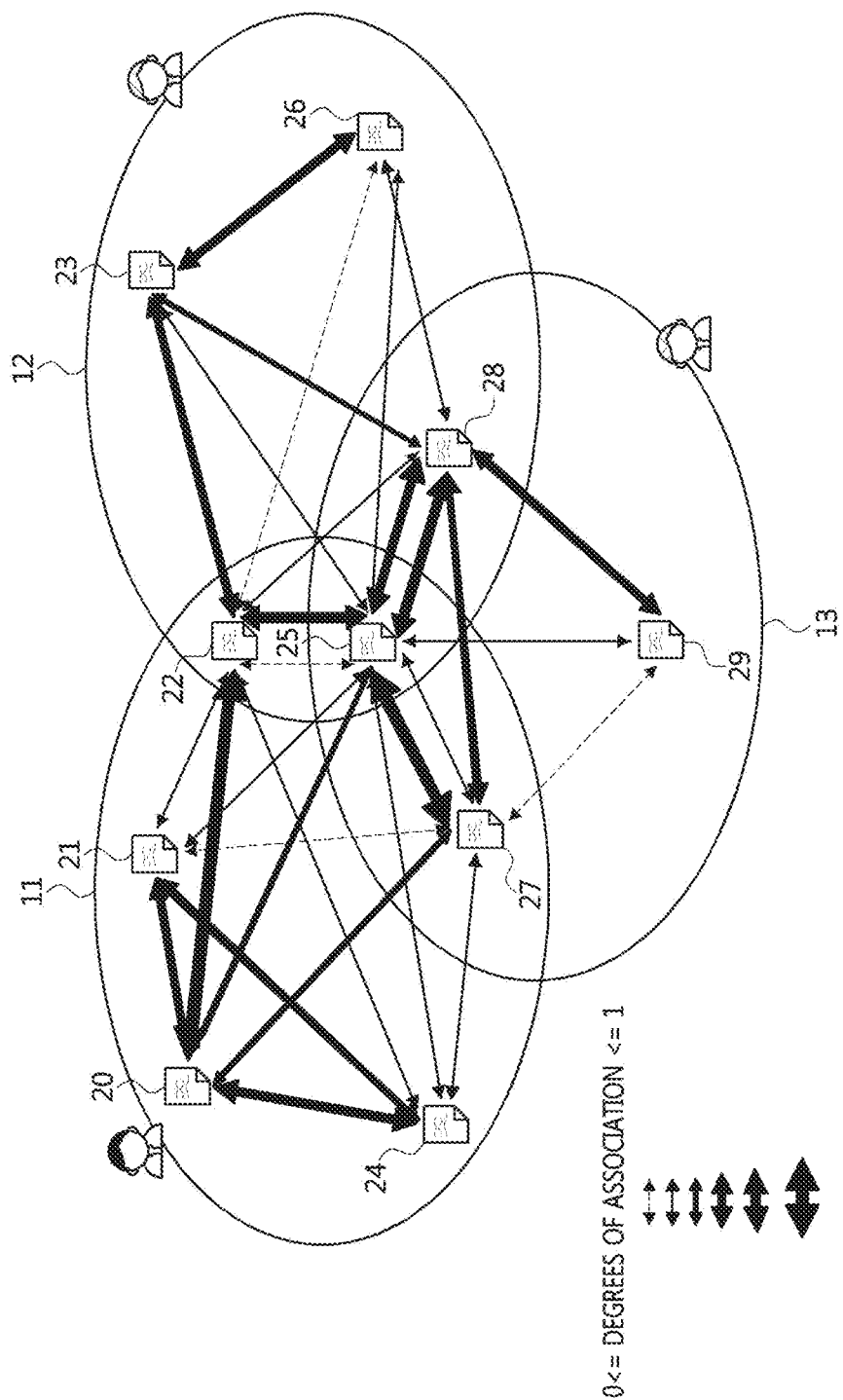
FIG. 2 is a conceptual view for describing degrees of association between notes according to an example embodiment.
Figure 3:
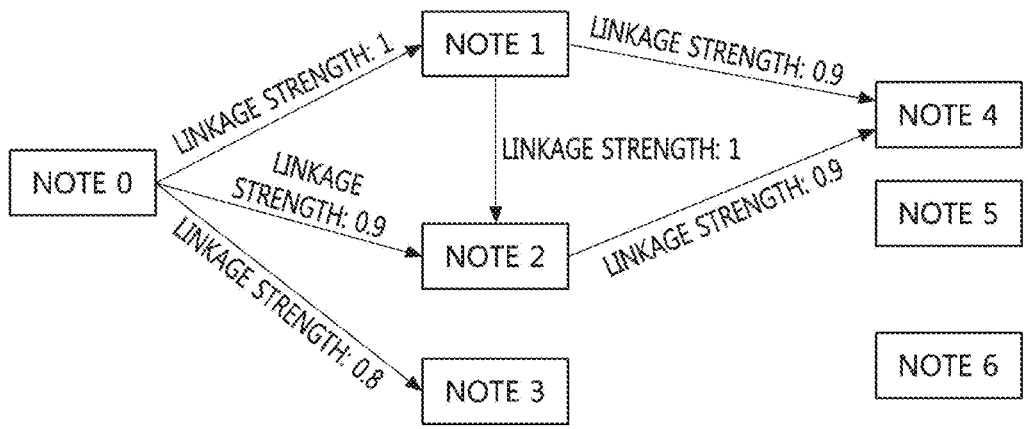
FIG. 3 is an example view for describing the degrees of association between notes according to an example embodiment.

FIG. 2 is a conceptual view for describing degrees of association between notes according to an example embodiment, and FIG. 3 is an example view for describing the degrees of association between notes according to an example embodiment.

According to an example embodiment, an associated note may refer to notes directly connected and registered by a user among a plurality of notes registered by the user. By adjusting linkage strength between the associated notes in accordance with a period of time and a user's feedback, more meaningful information (i.e. a note) may be preferentially displayed.

Therefore, a user can assort or easily find information just by linking pieces of information related to the associated note.

Referring to FIG. 2, and FIG. 3, the notes according to an example embodiment may be associated with each other, and strength of association may be represented by the degrees of association. Therefore, according to this embodiment, the degrees of association between notes may have the same meaning as association, linkage strength, relationship, etc. and the associated note may indicate a linked note with association among other notes.

According to an example embodiment, the notes may be made and stored in the user terminal 100 in the form of an electronic or digital memo. Further, the notes may be assorted by type into schedule notes, things-to-do notes, memo notes, etc.

The input information according to the types of notes may be given as shown in the following Table 1.

TABLE 1

| | Schedule note | Things-to-do note | Memo note |
|---|---|---|---|
| Common input items | Titles, Content, Tags, Open Range, Associated Note | | |
| Input items according to types | Schedules, Alarm, Repetition or not, Places, People concerned | Deadline, Completion or not | |

According to an example embodiment, a tag instruction may be utilized to search the notes more easily.

For example, when content for a note is input, '@', and '#' are input to suggest information interworking with contact information and places previously stored in the user terminal 100, and content may be input by taking the suggested information into account.

More specifically, words similar to a user name being typed when '@' is input are searched in and suggested from an address book. When there are no similar words, a user name may be newly registered.

Words similar to a place input when '#' is input are searched, and the input place may be automatically added when there are no similar words.

According to an example embodiment, the notes may be listed in an order based on the degrees of association between notes (or the degrees of association), and provided to the user terminal 100.

Further, the degrees of association may be schematized in a tree form and provided to the user terminal 100. For example, the degrees of association may be represented by a line of connecting notes, and the degrees of association may be represented by the thickness of the line.

One note may be set to have degrees of association with a plurality of other notes, and the degrees of association may be initially set by a user's direct input through the user terminal 100, or by similarity between pieces of information included in notes.

For example, the degrees of association may be set to range from 0 to 1. When a degree of association is 0, there may be no association between notes. When a degree of association is 1, there may be the highest association between notes. However, the degrees of association according to an example embodiment may be set within various numerical ranges.

Referring to FIG. 2, the plurality of notes may be linked by degrees of association.

For example, a note 20 may be associated with the note 21, the note 22, the note 24, the note 25, and the note 27, and have degrees of association in the order of the note 22>the note 21=the note 24>the note 25=the note 27. Therefore, when the note 20 is regarded as a reference note, the associated notes may be displayed as the note 22>the note 21=the note 24>the note 25=the note 27 on the user terminal 100 in descending order of degrees of association.

Further, when the note 23 is associated with the note 22, the note 25, the note 26, and the note 28, the degrees of association may be given in the order of the note 22=the note 26>the note 28>the note 25. Therefore, when the note 23 is regarded as a reference note, the associated note may be displayed as the note 22=the note 26>the note 28>the note 25 on the user terminal 100 in descending order of degrees of association.

Accordingly, a user can more effectively check and manage the plurality of associated notes by degree of association.

Furthermore, as an additional function, the notes may be shared between users. Referring back to FIG. 2, the plurality of notes may be placed in a first user region 11, a second user region 12, and a third user region 13.

Further, each of the first user region 11, the second user region 12, and the third user region 13 may include an intersection area.

For example, the note 25 is positioned in an area where three areas overlap, and may thus denote a note to be sharable among all the users. Further, the note 27 is placed in a region where the first user region 11 and the third user region 13 overlap, and may thus denote a note to be shareable only between the first user and the second user. Likewise, the note 28 is placed in a region where the second user region 12 and the third user region 13 overlap, and may thus denote a note to be sharable only between the second user and the third user. The note 22 is placed in a region where the first user region 11 and the third user region 13 overlap, and may thus denote a note to be sharable only between the first user and the third user. Here, each note may be set to have a sharing range by each user through the user terminal 100.

Referring to an example shown in FIG. 3, the note 0 is set to have a linkage strength of 1 in association with the note 1, a linkage strength of 0.9 in association with the note 2, and a linkage strength of 0.8 in association with the note 3. Therefore, the note 0 has the highest association with the note 1 among the note 1, the note 2, and the note 3.

Further, the note 1 may be set to have a linkage strength of 1 in association with the note 2, a linkage strength of 0.9 in association with the note 4, and a linkage strength of 0.9 in association with the note 5.

Further, the note 5 and the note 6 may be set to not have degrees of association with any other notes.

The degrees of association between notes may be not only initially set by the user terminal 100, but also updated by the associated-note providing server 200.

The associated-note providing server 200 may adjust or update the degrees of association between notes in accordance with settable references. Herein, the settable references may include an elapsed time, the number of association inquiries, an inquiry time, an association degree score assigned by a user, the order in which a user clicks associated notes, similarity between pieces of information included in a plurality of notes, etc.

For example, the elapsed time may refer to time elapsed after initially setting the degrees of association. Further, the number of association inquiries may refer to the number of times which the plurality of notes are inquired simultaneously or together, the inquiry time may refer to a time point at which a corresponding note is inquired, and the association degree score assigned by a user may refer to an association degree score additionally set or given by a user after initially setting the degrees of association. Further, the order in which a user clicks the associated notes may refer to information about a pattern or order in which a user clicks and checks notes. Further, the similarity between pieces of information included in the plurality of notes may be calculated by analysis of the content of the notes by, for example, using analysis based on an inline tag involved in the note, a morphemic analysis technique, etc.

More specifically, the degrees of association may become lower as the elapsed time increases, the degrees of association may become higher as the number of association inquiries increases, and the degrees of association may become higher as the inquiry time corresponds to business hours. Further, the degrees of association may become higher between associated notes clicked by a user in close succession, and the degrees of association may become higher as the similarity between pieces of information included in the plurality of notes increases.

To calculate the degrees of association, the following Expression 1 may be employed. However, the calculation for the degrees of association according to an example embodiment is not limited to only the Expression 1.

Therefore, according to an example embodiment, the degrees of association may be updated adaptively or by artificial intelligence based on machine learning using an algorithm, a model, or the like to which various parameters, weights, etc. are applied. That is, the associated-note providing server 200 according to an example embodiment may be materialized by an intelligent server.

$$r=1-(\alpha(t_e-t_s)-\beta(l_c+l_f)-\gamma\Sigma_{i=0}^f r_i-\delta u)$$ [Expression 1]

α, β, γ, δ: Weights of elements, θ at initial linkage
$t_c$, $t_s$: Time at inquiry point, Time at linkage point
$l_c$, $l_f$: The number of note inquiries, inquiry frequency
f, $n_i$: The number of linked notes. Aggregate degree of association of notes
u: Score of associated degree designated by user FIG. 4 is a process view for describing the method of providing an associated note according to an example embodiment.

Figure 4:
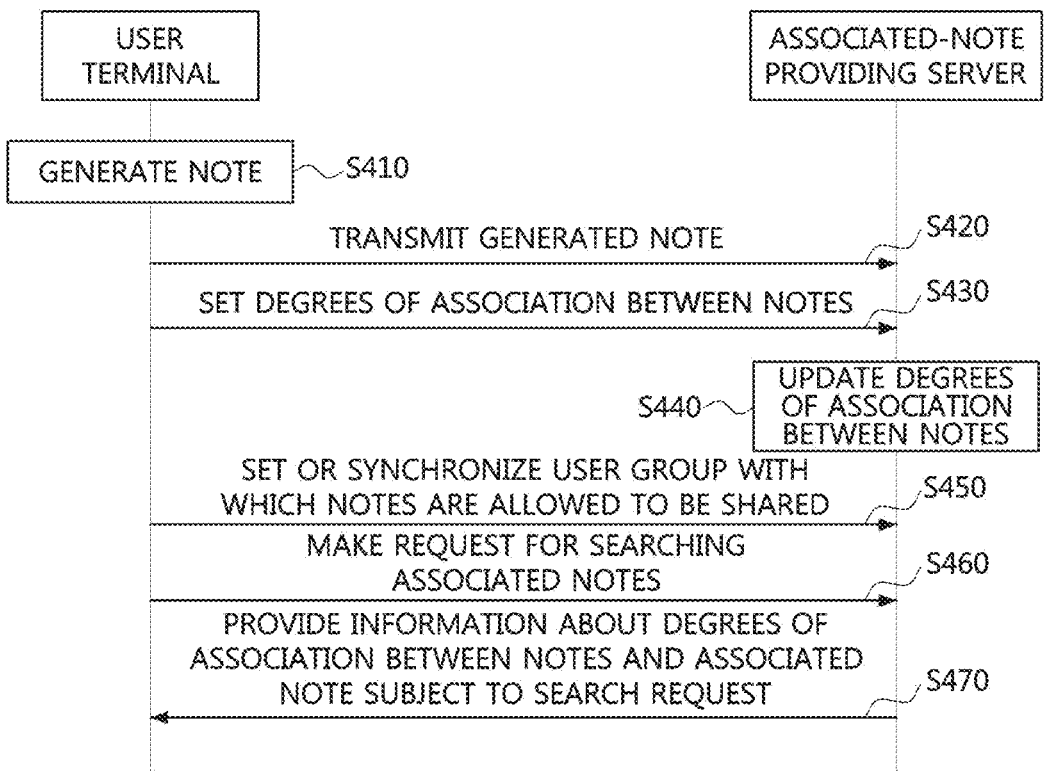
FIG. 4 is a process view for describing the method of providing an associated note according to an example embodiment.

Referring to FIG. 4, a user may input information into the user terminal 100 to thereby make a note (S410). Here, the note may be one of various kinds of notes, such as a schedule note, a things-to-do note, a memo note, etc.

The user terminal 100 may transmit the made note to the associated-note providing server 200 (S420), and the associated-note providing server 200 may store the note received from the user terminal 100.

The user terminal 100 may set degrees of association between the notes stored in the associated-note providing server 200 (S430). Therefore, the associated-note providing server 200 receives and stores a plurality of notes from and in the user terminal 100, and also stores the degrees of association, which indicate association between the notes.

In particular, the associated-note providing server 200 according to an example embodiment may adjust or update the degrees of association between notes (S440). For example, the degrees of association may be adjusted or updated with respect to the elapsed time, the number of association inquiries, the inquiry time, the association degree score assigned by a user, the order in which a user clicks the associated notes, and the similarity between pieces of information included in the plurality of notes and like settable references.

A user may check the notes stored in the associated-note providing server 200 through the user terminal 100. That is, the associated-note providing server 200 may provide the plurality of notes to the user terminal 100 on the basis of the degrees of association between notes. For example, the plurality of notes may be displayed on the user terminal 100 in descending order of the degrees of association between notes with respect to a note selected among the plurality of notes. Accordingly, a user can easily check and manage other notes associated with the selected note without any separate searching or assorting process.

Further, as an additional function, a user can use the user terminal 100 to search for the notes stored in the associated-note providing server 200 (S460). For example, a keyword or tag may be used in searching for the notes. The associated-note providing server 200 may provide the note corresponding to a search request from the user terminal 100 and provide information about the degrees of association to the user terminal 100 (S470). Here, the information about the degrees of association may be schematized and provided, and the degrees of association may be represented by regarding the notes as nodes and connecting the nodes by lines. However, there are no specific limits to the representations.

Furthermore, as an additional function, the user terminal 100 may set or synchronize a user group with which a note is allowed to be shared (S450). For example, a user may set whether to share the made note through the user terminal 100, and set another user with which the note will be shared, thereby setting the user group with which the note is allowed to be shared. In other words, the user group with which the note is allowed to be shared may be set with respect to each individual group. Further, operations for setting or synchronizing the user group with which the note is allowed to be shared are not limited to the sequence shown in FIG. 4, and may be performed at a time point in accordance with schedule cycles or a user's convenience.

Figure 5:
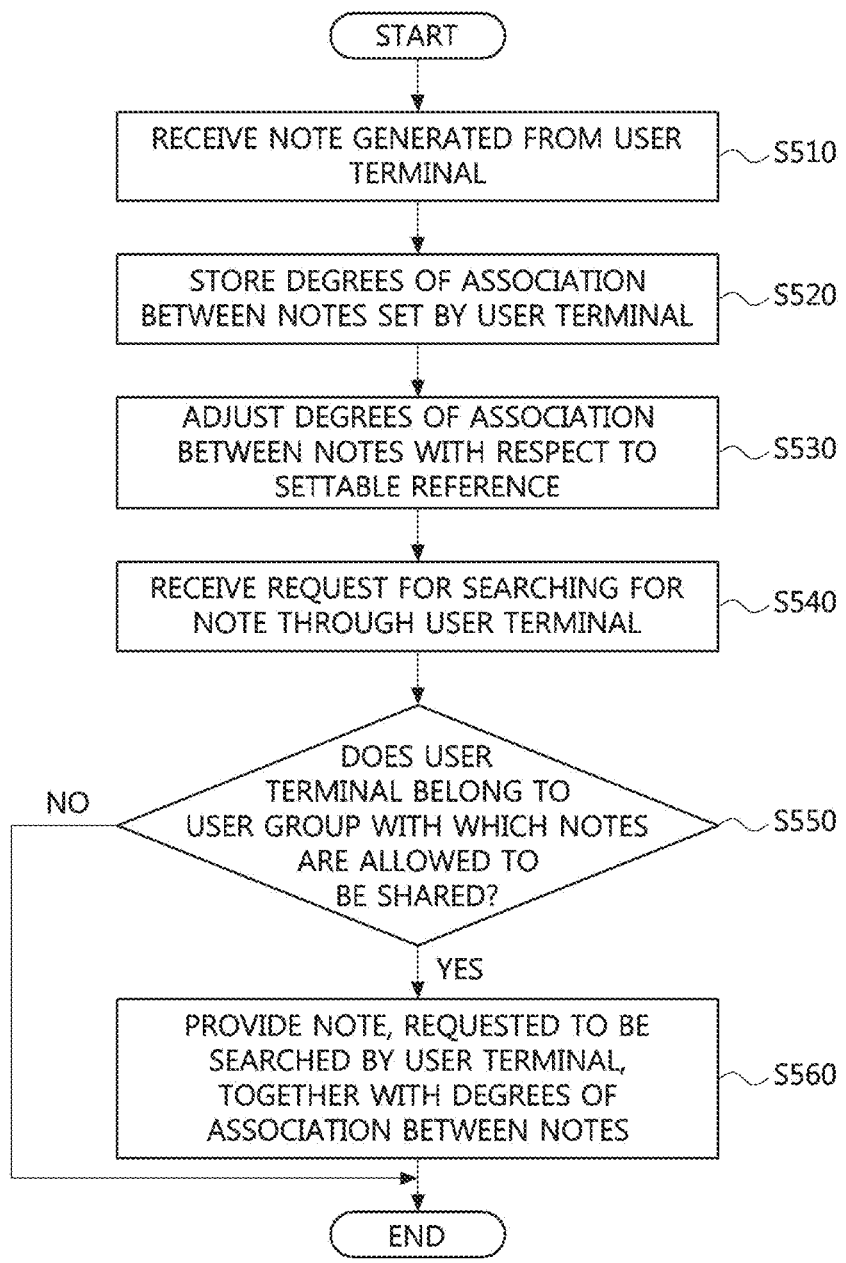
FIG. 5 is a flowchart for describing a method performed by an associated-note providing server according to an example embodiment.

FIG. 5 is a flowchart for describing a method performed by an associated-note providing server according to an example embodiment.

Referring to FIG. 5, the method of providing an associated note, which is performed in the associated-note providing server 200, is as follows.

The associated-note providing server 200 is capable of receiving at least one made note from the user terminal 100 (S510), and the received notes may be stored in a database 300.

The associated-note providing server 200 may store the degrees of association between the notes, which is set by the user terminal 100 (S520). For example, the degrees of association between the notes may be set between 0 and 1.

The associated-note providing server 200 may adjust the degrees of association between the notes in accordance with settable references (S530). Herein, the settable reference may be determined based on at least one among the elapsed time, the number of association inquiries, the inquiry time, the association degree score assigned by a user, the order in which a user clicks the associated notes, and the similarity between pieces of information included in the plurality of notes.

Therefore, the associated-note providing server 200 may provide the plurality of notes to the user terminal 100 based on the degrees of association between the notes (S550), so that a user can more effectively check associated notes stored in the associated-note providing server 200 through the user terminal 100.

Further, as an additional function, the associated-note providing server 200 may receive a note searching request through the user terminal 100 (S540). For example, the user terminal 100 may use a keyword, a tag, etc. to search for a specific note, and the associated-note providing server 200 may provide a search result to the user terminal 100 in response to the keyword, the tag, etc.

Further, as an additional function, the associated-note providing server 200 may determine whether the user terminal 100 making a request for the search belongs to the user group in which the note is allowed to be shared (S550), and provide the note only when the user terminal 100 belongs to the user group with which the note is allowed to be shared. That is, the associated-note providing server 200 may provide at least one note together with information about the degrees of association to the user group in which the note is allowed to be shared.

Figure 6:
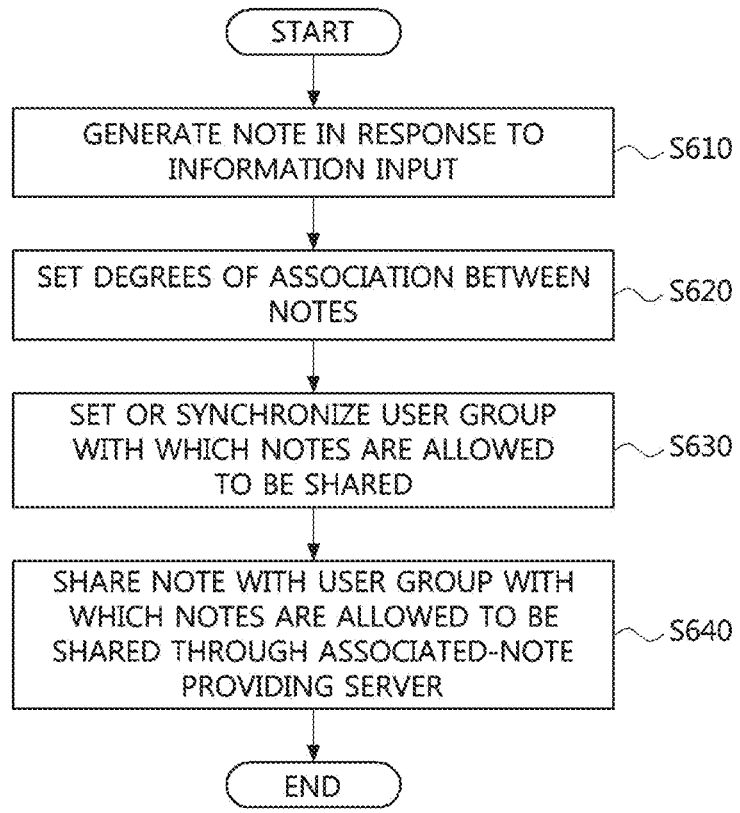
FIG. 6 is a flowchart for describing a method performed by a user terminal according to an example embodiment.

FIG. 6 is a flowchart for describing a method performed by a user terminal according to an example embodiment.

Referring to FIG. 6, the method of providing an associated note, which is performed in the user terminal 100, is as follows.

The user terminal 100 may generate a note in response to an information input (S610). That is, the user terminal 100 provides a user interface through which the note can be made, and the kind of generated note may be one of a schedule note, things-to-do note, a memo note, etc.

The user terminal 100 may set the degrees of association between the generated note and other notes (S620). A user may initially set the degrees of association between the notes through the user terminal 100. Here, the degrees of association between the notes may be set between 0 and 1.

The user terminal 100 may display the plurality of notes together based on the degrees of association between the notes adjusted or updated in accordance with the settable references. For example, the associated-note providing server 200 may update the degrees of association between the notes in accordance with the settable references such as the elapsed time, the number of association inquiries, the inquiry time, the association degree score assigned by a user, the order in which a user clicks the associated notes, the similarity between pieces of information included in the plurality of notes, etc. and then provide the updated degrees of association to the user terminal 100.

Further, as an additional function, the user terminal 100 may set or synchronize the user group with which the note is allowed to be shared, through the associated-note providing server 200 (S630). Further, operations of setting or synchronizing the user group in which the note is allowed to be shared are not limited to the sequence shown in FIG. 6, and may be performed at a time point in accordance with schedule cycles or convenience of a user. Accordingly, the user terminal 100 may make the note be shared with the user group, with which the note is allowed to be shared, through the associated-note providing server 200 (S640).

Figure 7:
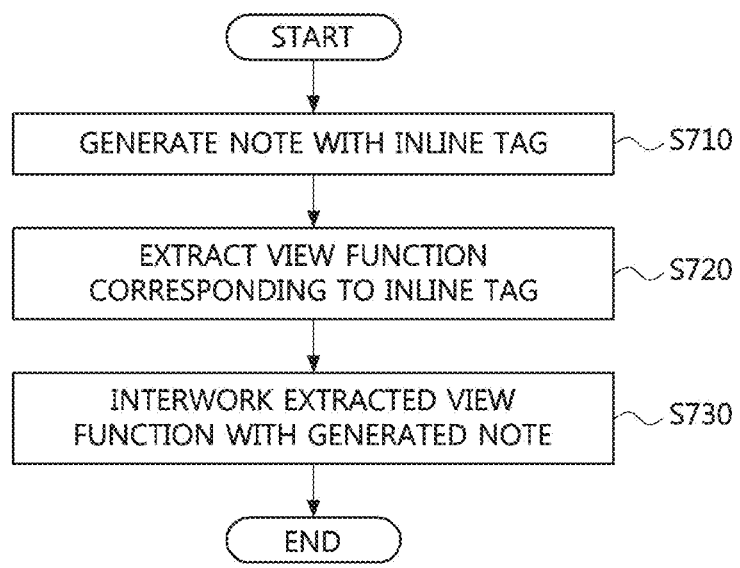
FIG. 7 is a flowchart for describing execution of a note generated according to an example embodiment.

FIG. 7 is a flowchart for describing execution of a note generated according to an example embodiment. Referring to FIG. 7, the user terminal 100 according to an example embodiment may generate a note including an inline tag through an information input (S710).

More specifically, the note may be generated by an input of information on a title and content. In particular, according to an example embodiment, the note may be generated with the inline tag in the title and content. Here, the inline tag may be applied to a name, a phone number, an e-mail address, a date, a place, etc.

The inline tag may be applied by inputting a special character in the front of a text to be subject to the inline tag without a space.

For example, the inline tag may be represented such thatname=@, phone number=&, e-mail address=%, date=*, place=#, etc. but is not limited thereto.

Further, when a combination of numerals is given in the form of "xxx-xxxx-xxxx", "xxx.xxxx.xxxx" or a like pattern, it is automatically tagged as a phone number, and an input of "D, M, YYYY", "M, D" or the like may be automatically tagged as a date.

Various view functions may be extracted corresponding to the inline tag (S720). Here, the extracted view function may be an additional function of the note, or may be supported by an application or the web which performs functions such as contact management, e-mail transmission, calendar display, map display, things to do, schedule management, and alarm functions, etc.

The extracted view function may interwork with the note (S730). For example, its description is as follows.

Figure 8:
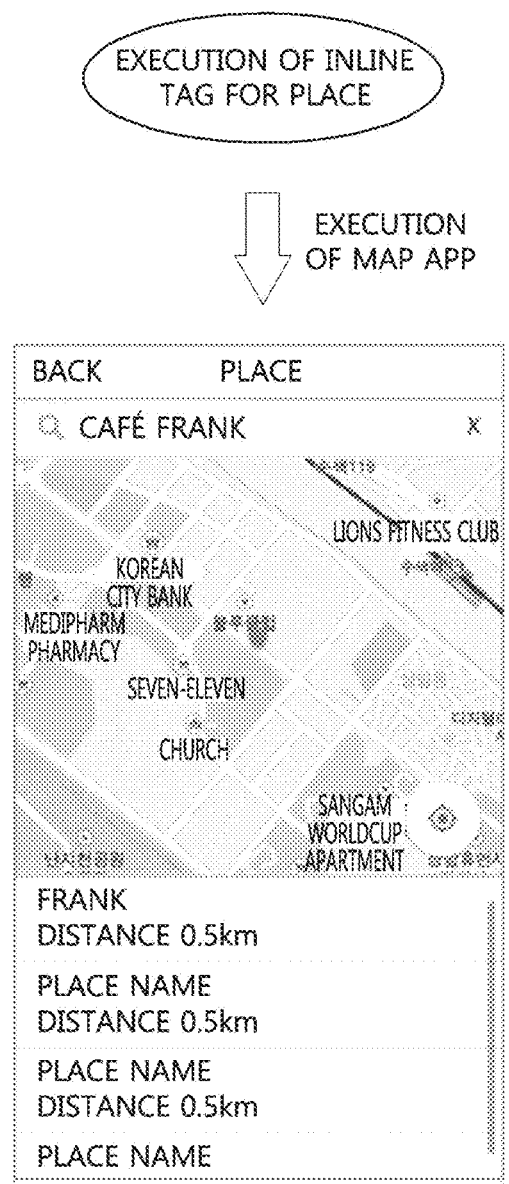
FIG. 8 is a first example view for describing interworking between an application and a note generated according to an example embodiment.

FIG. 8 is a first example view for describing interworking between an application and a note generated according to an example embodiment. FIG. 9 is a second example view for describing interworking between an application and a note generated according to an example embodiment.

FIG. 8 shows an example in which an application (app) having a map display function is executed while interworking with the execution of the tagging of a place with an inline tag, and FIG. 9 shows an example in which an application having the calendar display function is executed interworking with the execution of the tagging of a date with an inline tag.

Furthermore, according to an example embodiment, when the inline tag for the name or the phone number is executed, the application or the web having the contact management function may be executed. Further, when the inline tag for the date is executed, the application or the web having the schedule management or calendar display function may be executed. When the inline tag for the place is executed, the application or the web having the map display function may be executed. Likewise, when the inline tag for the time is executed, the application or web having the alarm function may be executed.

Additionally, information corresponding to the inline tag included in the note may be automatically synchronized with the searched application or the web and stored.

Further, there are no limits to the inline tag, and methods technically corresponding to the inline tag may be used.

Furthermore, the method of providing an associated note, according to an example embodiment, may analyze information related to the note and provide a service specialized and customized for a user through the user terminal 100 on the basis of analysis results.

Further, the information related to a note may include information about note content, association between notes, usage history, etc., and the service specialized and customized for a user may include information about selection and arrangement of notes, or associated applications.

For example, the analysis results may be obtained through analysis of attributes (e.g. a text, an image, a moving image, etc.) of content included in the notes, analysis of association between the notes according to the attributes of content included in the notes, analysis of patterns of using the notes, etc.

Accordingly, it is possible to provide a service specialized and customized for a user like interworking/synchronizing with a view function, an application, etc., which provides a note based on the degrees of association in accordance with such analysis results.

The foregoing method and apparatus for providing the associated note according to an example embodiment may provide a user interface for more effectively checking and managing a plurality of notes on the basis of degrees of association.

Further, according to an example embodiment, the degrees of association between notes may be updated by dynamic learning based on various parameters such as a user's usage pattern, information included in the notes, etc., and it is thus possible to improve convenience for a user.

Further, a note generated according to an example embodiment may provide a user interface for synchronizing information or interworking with another application or the web using inline tagging, thereby providing improved convenience to a user who uses the note and allowing the information to be more effectively managed.

The operations in the method of providing an associated note according to an example embodiment may be implemented in a computer readable recording medium as a computer-readable program or code. The computer readable recording medium includes all kinds of recording devices in which data readable by a computer system is stored. Further, the computer readable recording medium may be configured to store and execute a program or code distributed to a computer system connected to a network and readable by a computer in a distribution method.

Further, the computer readable recording medium may include hardware components configured to store and perform a program command, such as a read only memory (ROM), a random access memory (RAM), a flash memory, etc. The program command may include not only a machine language code produced by a compiler, but also a high-level language code executable by a computer through an interpreter or the like.

As described above, the method and apparatus for providing an associated note according to an example embodiment provides an intelligent and smart user interface for more effectively checking and managing a plurality of notes on the basis of degrees of association.

Further, the degrees of association between notes may be updated by dynamic learning based on various parameters such as a user's usage pattern, information included in the note, etc. and it is thus possible to improve convenience for a user.

Further, a note generated according to an example embodiment may provide a user interface for synchronizing information or interworking with another application or the web using inline tagging, thereby providing improved convenience to a user who uses the note and allowing the information to be more effectively managed.

While the example embodiments of the present invention and their advantages have been described in detail, it should be understood that various changes, substitutions and alterations may be made herein without departing from the scope of the invention.

What is claimed is:

1. A method of providing at least one associated note, which is performed in an associated-note providing server interworking with a user terminal, wherein the associated-note providing server and the user terminal comprises at least one processor, the method comprising:

receiving by the at least one processor at least one user-generated note generated from the user terminal;

updating by the at least one processor degrees of association between the at least one user-generated note and the at least one associated note, which indicate an association with the at least one user-generated note and the at least one associated note based on a settable reference; and providing by the at least one processor the at least one associated note to the user terminal on the basis of the degrees of association between the at least one user-generated note and the at least one associated note, wherein the degrees of association is updated based on machine learning using $$r=1-(\alpha(t_e-t_s)=\beta(l_c+l_f)-\gamma\Sigma_{i=0}{}^f r_i-\delta u)$$

wherein $\alpha$, $\beta$, $\gamma$, $\delta$ are weights of elements and zero at initial linkage, $t_e$ is a time at inquiry point and $t_s$ is a time at linkage point, $l_c$ is the number of note inquires, $l_f$ is the number of inquiry frequency, f is the number of linked notes, r_i is an aggregate of the degree of associated of notes, U is a score of associated degree designated by user.

2. The method of claim 1, wherein the settable reference comprises an elapsed time, a number of association inquires, an inquiry time, an association degree score, an order in which the at least one associate note is clicked, and similarity between information included in both the at least one user-generated note and the at least one associated note.

3. The method of claim 2, wherein the degrees of association are schematized in a tree form and provided to the user terminal.

4. The method of claim 1, further comprising sharing by the at least one processor at least one of the at least one user-generated note or the at least one associated note with a user group with which the at least one user-generated note or the at least one associated note is allowed to be shared.

5. The method of claim 4, wherein the user group with which the at least one user-generated note or the at least one associated note is allowed to be shared is at least one of set or synchronized by the user terminal.

6. The method of claim 1, wherein the at least one of the at least one user-generated note or the at least one associated note comprises at least one inline tag and the at least one inline tag interworks with a view function corresponding to the at least one inline tag.

7. A method of providing at least one associated note, which is performed in a user terminal interworking with an associated-note providing server, wherein the associated-note providing server and the user terminal comprises at least one processor, the method comprising:
  generating by the at least one processor the at least one associated note in response to an input of at least one user-generated note; and
  displaying by the at least one processor the at least one associated note on the user terminal based on degrees of association between the at least one user-generated note and the at least one associated note,
  wherein the degrees of association is updated based on machine learning using $$r=1-(\alpha(t_e-t_s)-\beta(l_c+l_f)-\gamma\Sigma_{i=0}^{f}r_i-\delta u)$$

wherein $\alpha$, $\beta$, $\gamma$, $\delta$ are weights of elements and zero at initial linkage, $t_e$ is a time at inquiry point and $t_s$ is a time at linkage point, $l_c$ is the number of note inquires, $l_f$ is the number of inquiry frequency, f is the number of linked notes, $r_i$ is an aggregate of the degree of associated of notes, u is a score of associated degree designated by user.

8. The method of claim 7, wherein the degrees of association between the at least one user-generated note and the at least one associated note is updated with respect to a settable reference in the associated-note providing server.

9. The method of claim 8, wherein the settable reference comprises an elapsed time, a number of association inquires, an inquiry time, an association degree score, an order in which the at least one associate note is clicked, and similarity between information included in both the at least one user-generated note and the at least one associated note.

10. The method of claim 7, wherein the degrees of association are schematized in a tree form.

11. The method of claim 10, wherein the user group with which the at least one user-generated note or the at least one associated note is allowed to be shared is set or synchronized by the user terminal.

12. The method of claim 7, wherein the at least one of the at least one user-generated note or the at least one associated note comprises at least one inline tag, and the at least one inline tag interworks with a view function corresponding to the at least one inline tag.

13. A method of providing at least one associated note, which is performed in a user terminal interworking with an associated-note providing server, wherein the associated-note providing server and the user terminal comprises at least one processor, the method comprising:
  generating by the at least one processor at least one user-generated note comprising at least one inline tag in response to an input of information from a user on the user terminal;
  extracting by the at least one processor a view function corresponding to the at least one inline tag;
  interworking by the at least one processor the extracted view function with the user-generated note; and
  receiving by the at least one processor the at least one associated note from the associated-note providing server on a basis of degrees of association between the at least one user-generated note and the at least one associated note,
  wherein the degrees of association is updated based on machine learning using $$r=1-(\alpha(t_e-t_s)-\beta(l_c+l_f)-\gamma\Sigma_{i=0}^{f}r_i-\delta u)$$

wherein $\alpha$, $\beta$, $\gamma$, $\delta$ are weights of elements and zero at initial linkage, $t_e$ is a time at inquiry point and $t_s$ is a time at linkage point, $l_c$ is the number of note inquires, $l_f$ is the number of inquiry frequency, f is the number of linked notes, $r_i$ is an aggregate of the degree of associated of notes, u is a score of associated degree designated by user.

14. The method of claim 13, wherein the inline tag is tagged with regard to at least one of a name, a phone number, an e-mail address, a date, a place, and a time.

15. The method of claim 13, wherein the extracted view function is supported by an application or internet which performs at least one function among contact management, e-mail sending, calendar display, map display, things to do, schedule management, and alarm functions.

16. The method of claim 15, wherein information tagged with the at least one inline tag is synchronized by at least one of the application or the internet.

17. The method of claim 16, wherein information tagged with the inline tag is synchronized by the application or the web.

18. The method of claim 13, wherein the at least one user-generated note has degrees of association with the at least one associated note which indicated an association between the at least one user-generated note and the at least one associated note, and the degrees of association are updated with respect to a settable reference in the associated-note providing server.

19. The method of claim 18, wherein the settable reference comprises an elapsed time, a number of association inquires, an inquiry time, an association degree score, an order in which the at least one associate note is clicked, and similarity between information included in both the at least one user-generated note and the at least one associated note.

20. The method of claim 13, further comprising:
  analyzing by the at least one processor information related to the at least one user-generated note,
  wherein the information related to the at least one user-generated note comprises at least one of note content, an association between notes, and a usage history, and wherein a service specialized and customized for a user is provided to the user terminal on the basis of results of the analysis.

* * * * *